(12) United States Patent
Porter

(10) Patent No.: US 8,845,094 B2
(45) Date of Patent: Sep. 30, 2014

(54) UNIVERSAL PROPS FOR WEARING SECONDARY GLASSES OVER PRIMARY GLASSES

(76) Inventor: Michelle P. Porter, Marietta, OK (US)

( * ) Notice: Subject to any disclaimer, the term of this patent is extended or adjusted under 35 U.S.C. 154(b) by 0 days.

(21) Appl. No.: 13/307,347

(22) Filed: Nov. 30, 2011

(65) Prior Publication Data

US 2013/0135576 A1 May 30, 2013

(51) Int. Cl.
*G02C 7/08* (2006.01)
*G02C 9/04* (2006.01)

(52) U.S. Cl.
CPC . *G02C 7/086* (2013.01); *G02C 9/04* (2013.01)
USPC ............................................. 351/57; 351/121

(58) Field of Classification Search
CPC .......... G02C 7/08; G02C 7/086; G02C 7/088; G02C 9/00; G02C 9/04
USPC ............... 351/47, 48, 50, 51, 52, 57, 58, 111, 351/116, 121, 140, 141, 158, 178, 827, 60, 351/112, 155; 2/10–12, 13, 15; 359/827
See application file for complete search history.

(56) References Cited

U.S. PATENT DOCUMENTS

| | | | |
|---|---|---|---|
| 4,986,649 A | | 1/1991 | Smith |
| 5,229,796 A | * | 7/1993 | Nitta ............................. 351/130 |
| 5,321,443 A | * | 6/1994 | Huber et al. ..................... 351/47 |
| 5,883,688 A | * | 3/1999 | Chao ............................... 351/47 |
| 5,940,162 A | | 8/1999 | Wong |
| 6,116,730 A | * | 9/2000 | Kwok ............................. 351/47 |
| 6,196,679 B1 | * | 3/2001 | Wong .............................. 351/47 |
| 6,354,703 B1 | * | 3/2002 | Sadler ............................ 351/57 |
| 7,018,037 B1 | * | 3/2006 | Jouver, III .................... 351/121 |
| 7,033,019 B2 | | 4/2006 | Ifergan et al. |
| 7,093,934 B1 | * | 8/2006 | Banker .......................... 351/47 |
| 2003/0030770 A1 | * | 2/2003 | Strenk ............................ 351/57 |
| 2006/0187408 A1 | * | 8/2006 | Lee et al. ........................ 351/47 |
| 2006/0203185 A1 | * | 9/2006 | Madison ........................ 351/47 |
| 2007/0076164 A1 | * | 4/2007 | Kim ................................ 351/47 |

OTHER PUBLICATIONS

Clipons; "G Flip Ups" Retrieved from http://www.clipons.com/product_gclip.php on Nov. 15, 2011.

(Continued)

*Primary Examiner* — Darryl J Collins
*Assistant Examiner* — Gary O'Neill
(74) *Attorney, Agent, or Firm* — Robert H. Frantz

(57) ABSTRACT

A prop system for a secondary pair of eyeglasses to be worn over and in front of a primary pair of eyeglasses having a prop portion of substantially rigid material, the prop portion having an inward edge and an outward edge; and an attachment portion disposed on the outward edge wherein the attachment portion is affixable to a secondary pair of eyeglasses thereby providing a prop extending essentially orthogonally and inwardly from the secondary eyeglasses, wherein the prop portion may engage one or more upper surfaces of a primary pair of eyeglasses to support the secondary eyeglasses when placed over the primary pair of eyeglasses in a manner that avoids creating a sensation to a wearer of wearing two pairs of eyeglasses.

12 Claims, 5 Drawing Sheets

(56) References Cited

OTHER PUBLICATIONS

Fitovers; "Fitover Wrap Around Sunglasses" Retrieved from http://www.fitovers.com/ on Nov. 14, 2011.
Optical4less; "Clipon Sunglasses with RX Eyeglasses" Retrieved from http://www.optical4less.com/clipon-sunglasses/ on Nov. 15, 2011.
Speert; "Fitover Sunglasses" Retrieved from http://www.speert.com/fitover-sunglasses.cfm?gclid=CO-fwIDztqwCFQ on Nov. 14, 2011.
Highbeam; "Women's Accessory and Specialty Stores"; Retrieved from http://business.highbeam.com/industry-reports/retail/women-s-accessory-...1 on Nov. 18, 2011.

Bea; "Personal Consumption Expenditures by Major Type of Product and by Major Function"; Retrieved from http://www.bea.gov/iTable/db_message.cfm on Nov. 18, 2011.

\* cited by examiner

UNIVERSAL PROPS FOR WEARING SECONDARY GLASSES OVER PRIMARY GLASSES

BACKGROUND OF THE INVENTION

1. Field of the Invention

This invention relates to structures and mechanisms for eyeglasses, safety glasses, sunglasses, and the like, and more particularly to structures and devices for allowing two pairs of glasses to be worn simultaneously.

2. Background of the Invention

There are many situations in which a person may wish to wear two pairs of glasses or eye protection simultaneously. Commonly, persons who wear prescription eyeglasses may also wish or need to wear sunglasses. Known solutions for this are owning a second pair of prescription eyeglasses in which the lenses are tinted, wearing a pair of "clip-on" lenses which clip to the top of the frame of the non-tinted prescription eyeglasses, wearing a "fit over" pair of sunglasses (e.g. cataract glasses), and using a pair of magnetically attached sunglasses designed specifically to attach to the non-tinted prescription glasses.

There are many other situations in which two sets of eye wear may also be appropriate, such as when wearing goggles over prescription eyeglasses for extra eye protection, and when doing certain work that requires magnification such as medical work, dental work, electronic assembly, jewelry and watch repair, etc. Some secondary eye wear includes special color filters for certain types of work, such as looking at biological specimens which have been dyed in a laboratory environment, or searching for biological evidence during a crime scene investigation.

In all of these and other scenarios, there may arise a need or desire to wear a second pair of eyeglasses over or in front of a first pair of eyeglasses as is known in the art

SUMMARY OF THE INVENTION

A prop system for a secondary pair of eyeglasses to be worn over and in front of a primary pair of eyeglasses having a prop portion of substantially rigid material, the prop portion having an inward edge and an outward edge; and an attachment portion disposed on the outward edge wherein the attachment portion is affixable to a secondary pair of eyeglasses thereby providing a prop extending essentially orthogonally and inwardly from the secondary eyeglasses, wherein the prop portion may engage one or more upper surfaces of a primary pair of eyeglasses to support the secondary eyeglasses when placed over the primary pair of eyeglasses in a manner that avoids creating a sensation to a wearer of wearing two pairs of eyeglasses.

BRIEF DESCRIPTION OF THE DRAWINGS

The following detailed description when taken in conjunction with the figures presented herein provide a complete disclosure of the invention.

DESCRIPTION OF THE INVENTION

The present inventor has recognized a problem in the art not yet fully satisfied by available devices and methods for wearing two pairs of eyeglasses simultaneously. While exemplary embodiments involving a first pair of eyeglasses being prescription eyeglasses and second pair of eyeglasses being a pair of sunglasses will be used to illustrate one or more embodiments of the present invention and one or more methods of usage of the present invention, it will be readily recognized by those skilled in the art that embodiments of the invention and uses of the invention extend beyond these illustrative examples.

The inventor has realized that all of the aforementioned solutions for dual eyewear are limited in one or more ways, including, some require the secondary pair of eyeglasses to be mechanically matched to the primary pair of eyeglasses (e.g the magnetically attached sunglasses), some limit the fashion or style choices of the wearer, some are not attractive or fashionable at all but instead are quite unattractive (e.g. fit overs), and some provide function over form (e.g. clip-ons, fit overs, etc.) The U.S. Bureau of Economic Analysis indicates as of Oct. 28, 2011, that personal consumption expenditure on clothing and footwear combined is steadily increasing quarter-over-quarter, and currently runs about $350 billion per quarter. A market report for women's accessories from Highbeam Business projected growth of the sunglasses (presumably women's only) to be over 5% in 2010.

However, the present inventor has realized that much of the available market, namely those persons who wear prescription eyeglasses, are excluded from the growing and very profitable market of fashion sunglasses. Rather, these persons are limited to the aforementioned mechanically-matched options of clip-ons, wrap-arounds, fit-overs, magnetically adapted fixtures, and specialty lenses (e.g. second pair of prescription glasses). Embodiments according to the present invention address these unsatisfied needs in the market.

Embodiments of the present invention include a set of props which attach to the hinge screws on secondary eyewear, such as fashion sunglasses. Whereas most such eyewear includes two hinges, one each disposed at the leftmost and rightmost edges of the glasses frames to allow the left and right temple pieces to fold inward for compact storing, the present solution is nearly universal.

Figure 4A:
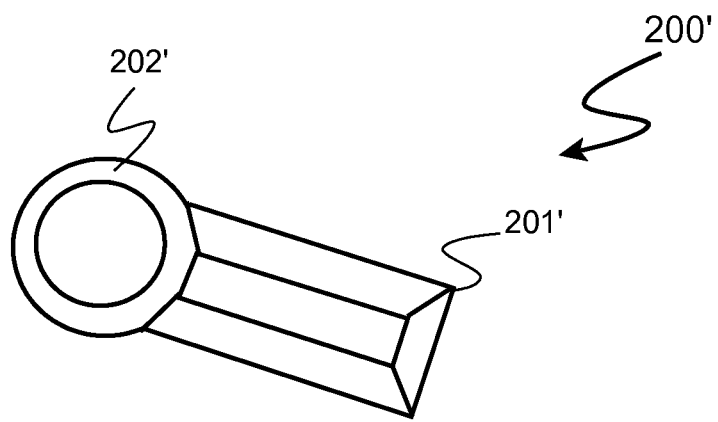
FIGS. 4*a* and 4*b* depict two available embodiments of secondary eyeglasses props according to the present invention.
Figure 4B:
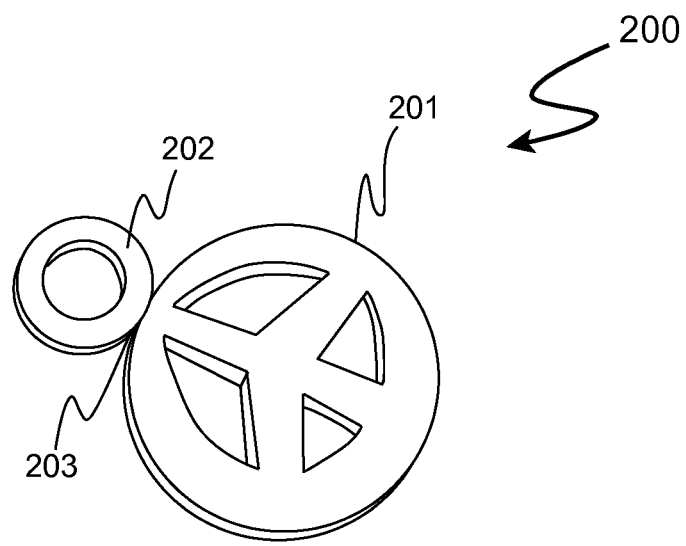

Turning to FIGS. 4*a* and 4*b*, two example embodiments (200, 200') are shown in which a prop portion (201, 201') is provided with an attachment eyelet (202, 202'). The attachment eyelet is rigidly affixed to the prop portion using a process such as gluing, soldering, crimping, or it may be formed unitarily with the prop portion such as through molding or machining Either or both elements (201, 201', 202, 202') are preferably constructed of a rigid material strong enough to support the weight of a typical pair of sunglasses, approximately 1 ounce, more or less, without flexing, bending or breaking, such as but not limited to metal and plastic, or even some natural materials such as wood, bone, and shell.

The attachment eyelet in these embodiments contains a hinge screw orifice disposed through it suitable sized to receive a typical eyeglasses hinge screw. The attachment eyelet can form a full annular ring around the orifice, or, it may be provided with a notch or gate (e.g. "C" shape) which may provide an advantage for ease of installation.

The shape of the prop portion is preferably round, rectangular, or any other shape and size which does not pose a danger of contacting or injuring the wearer when installed in the manner described in the following paragraphs. The prop portion may be provided with a non-slip, non-mar coating or treatment on the underside of the prop portion, such as a layer of vinyl, cork, silicone, or other suitable material.

Figure 2:
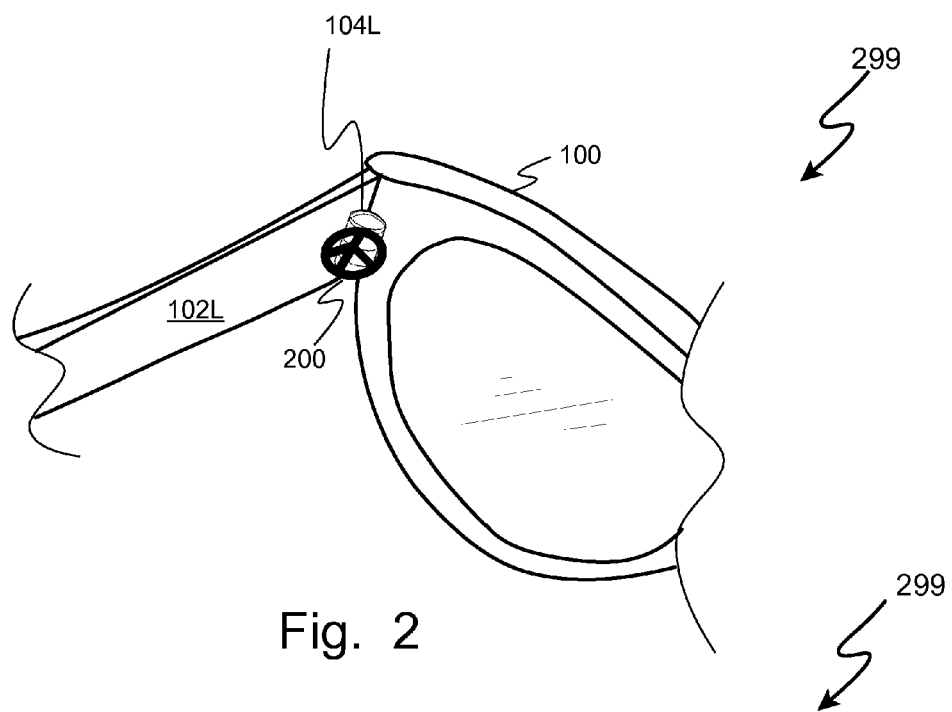
FIG. 2 provides a detailed view of an installed prop on a left hinge of a set of secondary eyeglasses.

Turning to FIG. 2, a prop (200) is shown installed (299) on the left hinge (104L) of a pair of secondary or "outer" glasses which are intended to be worn on the outside of a primary or "inner" pair of glasses. The left hinge (104L) is disposed between the left temple piece (102L) and the leftmost edge of the frame (100). The frame typically carries one or two lenses, as is well known in the art.

Figure 3:
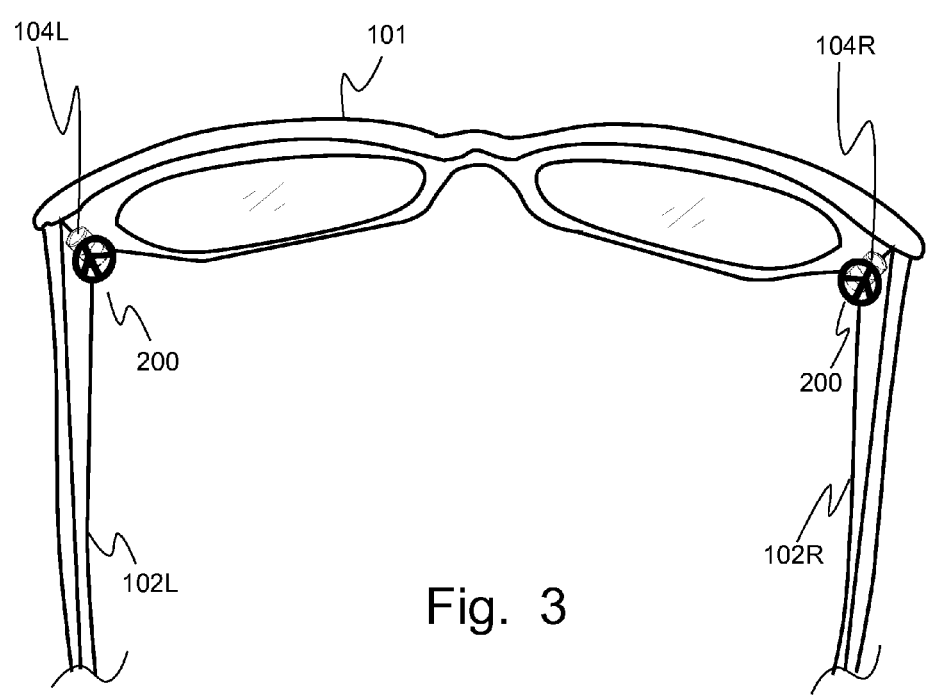
FIG. 3 shows a broader view of two props installed on the hinges of a set of secondary eyeglasses.

To install the prop (200), the screw is removed from the hinge (104L), the orifice of the attachment eyelet is aligned with the core of the hinge, and the screw is re-installed in the core of the hinge, thereby capturing the attachment eyelet of the prop under the head of the screw. Alternatively, if the prop (200) is provided with an open attachment eyelet (e.g. "C" shaped eyelet), the hinge screw may be merely unscrewed partially, without removal from the hinge, so as to receive the eyelet under the head of the screw, and the screw may be tightened to secure the prop in place. This leaves the prop protruding approximately orthogonally from the core or barrel of the hinge, as shown. The same process is repeated for a second prop (200) on the right hinge (104R) between the right temple piece (102R) and the rightmost edge of the frame (101) of the secondary or outer glasses, as shown in FIG. 3.

Figure 1:
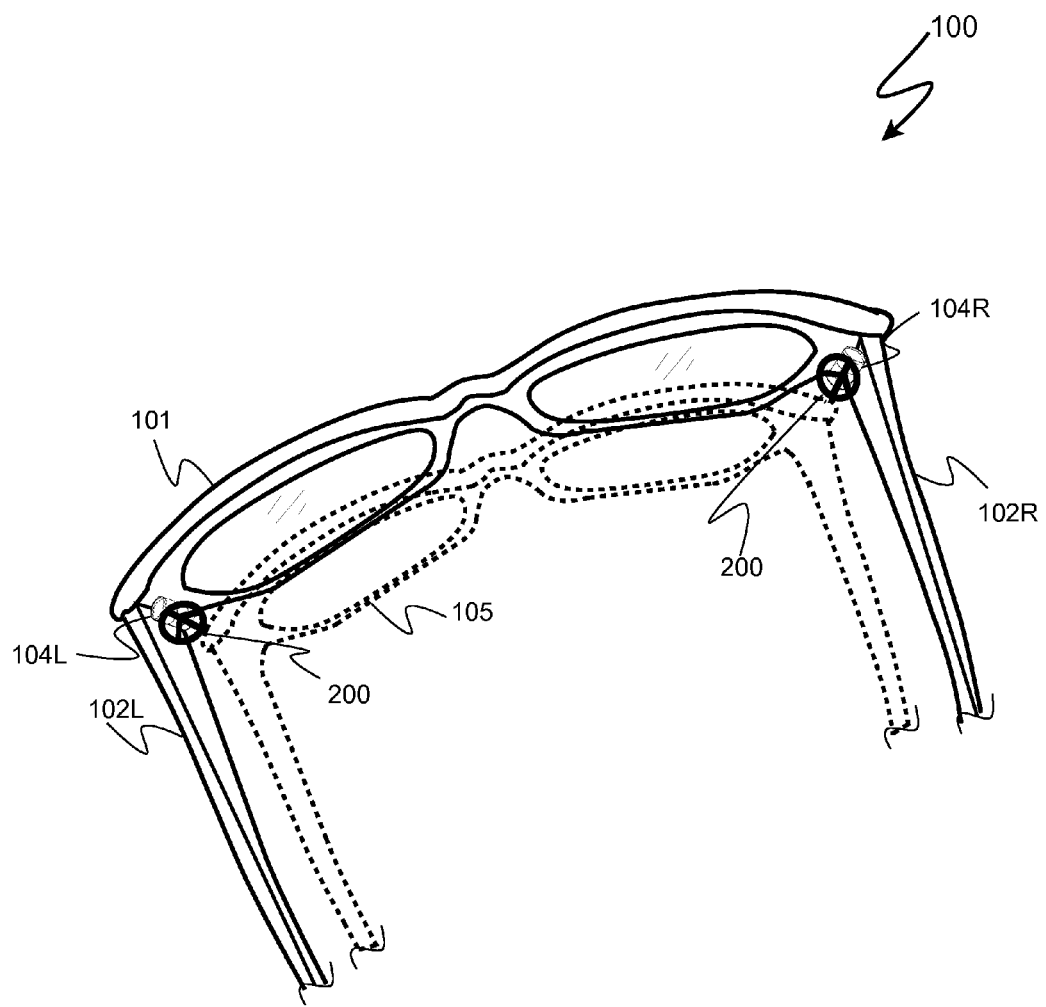
FIG. 1 illustrates a manner of usage of a prop system according to the present invention.

Referring now to FIG. 1, the outer or secondary glasses equipped with the props (200) may be worn over and in front of a primary or inner pair of glasses (105) wherein the bottomside of the props engages the upper leftmost and rightmost corners of the frame of the inner or primary glasses (105). The weight of the secondary glasses is born by the upper edge or top of the frames of the primary glasses such that the nosepiece of the secondary glasses does not put pressure on the nose of the wearer, which relieves the wearer of feeling the sensation of two pairs of glasses on their his or her nose. The optional non-slip, non-mar coating on the bottom side of the props may also aid in keeping the secondary glasses from slipping when the head is tilted or moved.

Such a set of props is attachable to virtually any pair of secondary glasses having hinges on the market today. Embodiments of the invention, therefore, allow secondary eyeglass manufacturers of products such as sunglasses, special filter glasses, safety glasses and magnification glasses, to reach the market of prescription glasses wearers. And, embodiments of the invention allow prescription glasses wearers to purchase almost any secondary glasses to be worn over and in front of their primary glasses, not just specialty secondary glasses such as wrap-arounds, fit-overs, clip-ons, and magnetically coupled sunglasses.

Figure 5A:
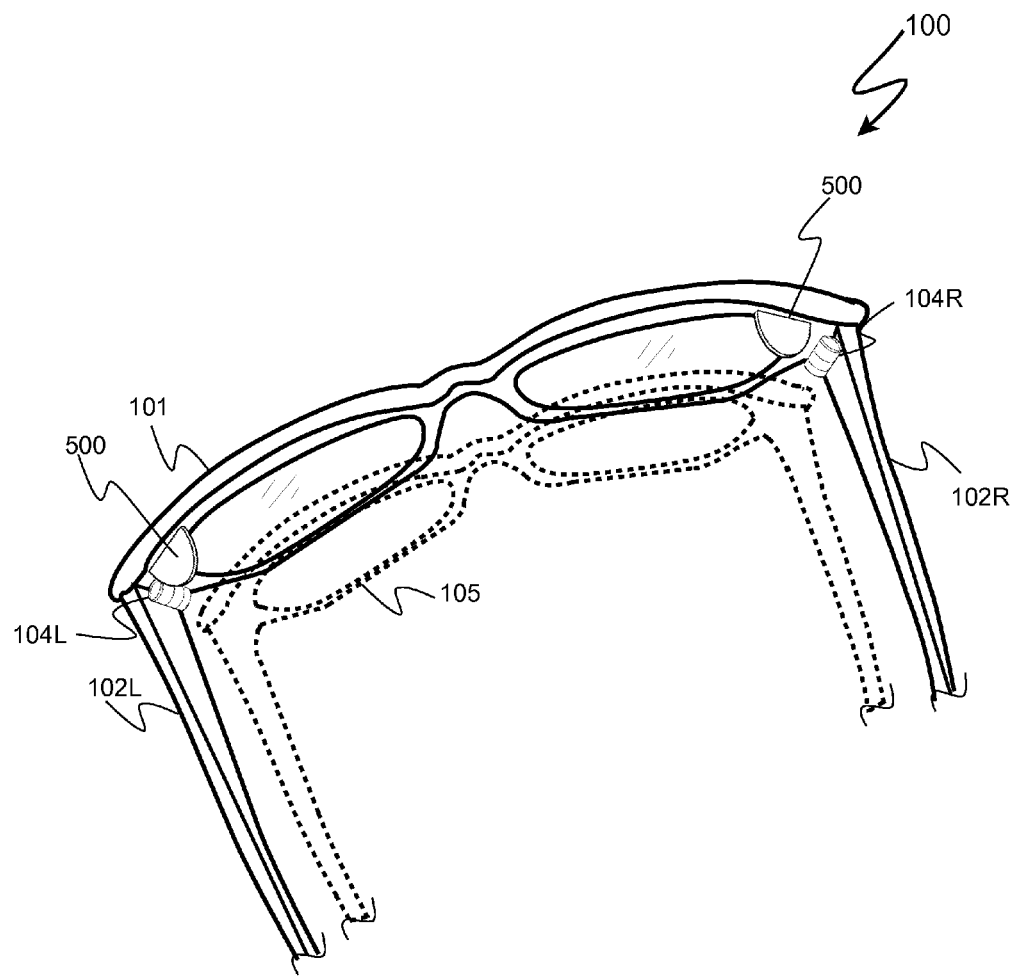
FIGS. 5*a* and 5*b* depict another approach to manufacturing props for secondary eyeglasses.
Figure 5B:
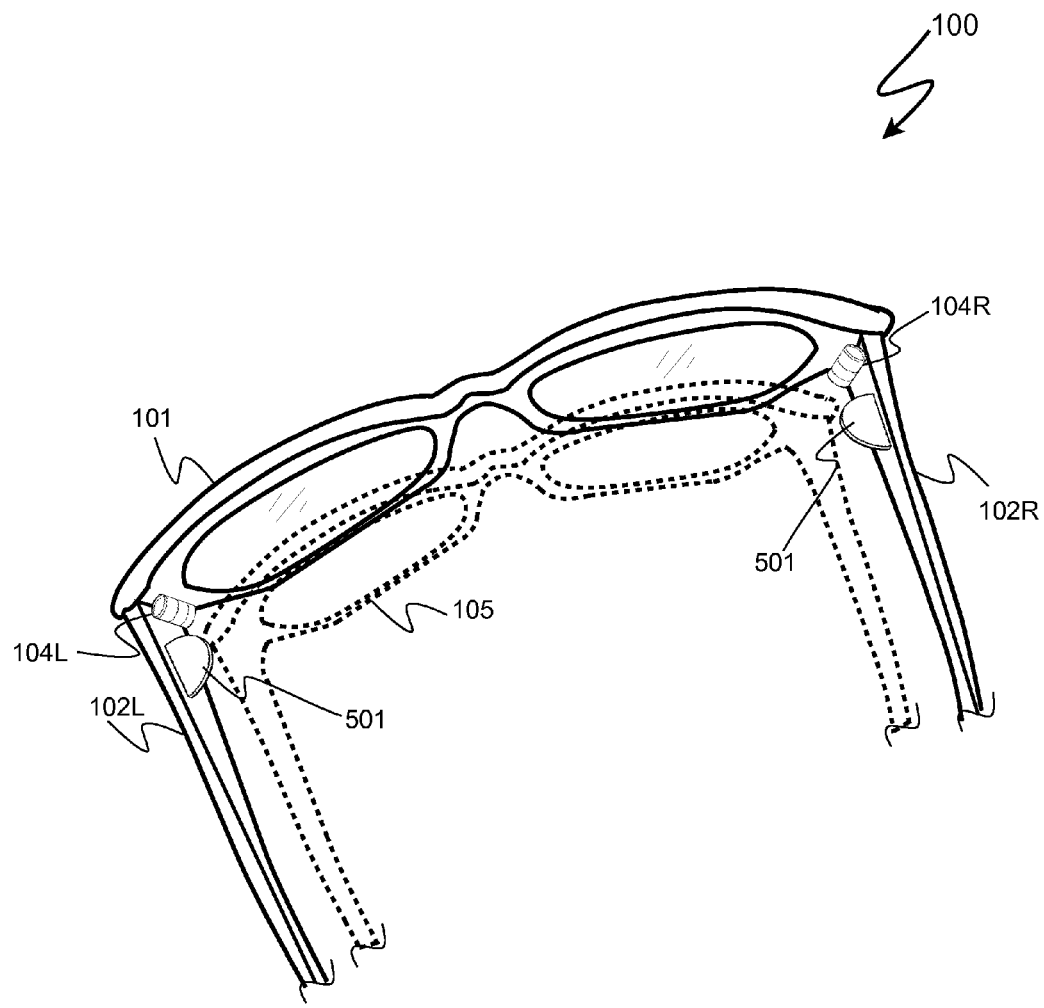

Turning now to FIGS. 5a and 5b, another related embodiment of props to support secondary eyeglasses on primary eyeglasses is shown in which the props are provided on the top region of the backside (wearer side) of the secondary frames (500), preferably on the inside of the temple pieces (501) as shown. The props may be attached to the secondary eyeglasses by gluing and optionally they may be hinged so as to fold away, preferably downward when not in use.

In one approach to manufacturing, the props may be attached by the frame's manufacturer, or they may be supplied separately by the manufacturer or another manufacturer as a kit, such as props with peel-away release paper to expose an adhesive for affixing the props to the secondary eyeglasses frames or temple pieces.

Summary

It will be appreciated by those skilled in the art that the aforementioned example embodiments do not represent the full scope and range of possible embodiments according to the present invention. A wide range of construction and manufacturing techniques may be employed, as well as materials and parts designs, to realize user-installable secondary eyeglasses props according to the spirit of the present invention.

What is claimed is:

1. A prop system for a secondary pair of eyeglasses comprising:
    a prop portion of substantially rigid material, the prop portion having an inward edge and an outward edge; and
    an attachment portion disposed on the outward edge affixable to a secondary pair of eyeglasses upon a wearer side of temples of the secondary pair of eyeglasses at positions proximate to a junction between the temples of the secondary pair of eyeglasses and a frame of the secondary eyeglasses, thereby providing a prop extending essentially orthogonally and inwardly from the temples of the secondary pair of eyeglasses;
    wherein the prop portion is receivable by resting upon upper surfaces of temples of a primary pair of eyeglasses to support a full weight of the secondary pair of eyeglasses when placed over the primary pair of eyeglasses, without the secondary pair of eyeglasses contacting a wearer's nose whereby the temples of the secondary pair of eyeglasses extend from the affixable prop positions away from the junction and towards an earpiece providing a counter balance to the weight of the frame of the secondary eyeglasses; and
    wherein donning and removal of the secondary pair of eyeglasses requires no wearer operation of a mechanical retention device or a magnetic retention device between the primary pair of eyeglasses and the secondary pair of eyeglasses other than lifting the secondary pair of eyeglasses up and away from the primary pair of eyeglasses, thereby enabling single-handed donning and removal of the secondary pair of eyeglasses.

2. The prop system as set forth in claim 1 wherein the prop portion is provided a non-slip coating on an underside of the prop portion.

3. The prop system as set forth in claim 1 wherein the prop portion is provided a non-mar coating on an underside of the prop portion.

4. The prop system as set forth in claim 1 wherein the attachment portion comprises an adhesive for disposition between the outward edge of the prop portion and the temples of the secondary pair of eyeglasses.

5. A method of manufacturing a prop system for a secondary pair of eyeglasses comprising:
    providing a prop portion of substantially rigid material; and
    forming or affixing to the prop portion an attachment portion affixable to a secondary pair of eyeglasses upon a wearer side of temples of the secondary pair of eyeglasses at positions proximate to a junction between the temples of the secondary pair of eyeglasses and a frame of the secondary eyeglasses, thereby providing a prop extending essentially orthogonally and inwardly from the temples of the secondary pair of eyeglasses, wherein the prop portion is receivable by resting upon upper surfaces of temples of a primary pair of eyeglasses to support a full weight of the secondary pair of eyeglasses when placed over the primary pair of eyeglasses, without the secondary pair of eyeglasses contacting a wearer's nose whereby the temples of the secondary pair of eyeglasses extend from the affixable prop positions away from the junction and towards an earpiece providing a counter balance to the weight of the frame of the secondary eyeglasses;

wherein donning and removal of the secondary pair of eyeglasses requires no wearer operation of a mechanical device or a magnetic retention device between the primary pair of eyeglasses and the secondary pair of eyeglasses other than lifting the secondary pair of eyeglasses up and away from the primary pair of eyeglasses, thereby enabling single-handed donning and removal of the secondary pair of eyeglasses.

6. The method as set forth in claim 5 further comprising providing a non-slip coating on an underside of the prop portion.

7. The method as set forth in claim 6 wherein the non-slip coating comprises one or more materials selected from the group consisting of rubber, vinyl, cork, and silicone.

8. The method as set forth in claim 5 further comprising providing a non-mar coating on an underside of the prop portion.

9. The method as set forth in claim 8 wherein the non-mar coating comprises one or more materials selected from the group consisting of rubber, vinyl, cork, and silicone.

10. The method as set forth in claim 5 wherein the substantially rigid material comprises one or more materials selected from the group consisting of metal, plastic, wood, bone and shell.

11. The method as set forth in claim 5 wherein the attachment portion comprises an adhesive for disposition between the prop portion and the temples of the secondary pair of eyeglasses 12. The method as set forth in claim 5 wherein the attachment portion comprises a hinge.

* * * * *